(12) United States Patent
Derdari

(10) Patent No.: US 8,444,167 B1
(45) Date of Patent: May 21, 2013

(54) HITCH LOCK DEVICE FOR TRAILERS

(76) Inventor: Nour-Eddine Derdari, Portsmouth, NH (US)

(*) Notice: Subject to any disclaimer, the term of this patent is extended or adjusted under 35 U.S.C. 154(b) by 308 days.

(21) Appl. No.: 12/970,253

(22) Filed: Dec. 16, 2010

(51) Int. Cl.
*B60D 1/60* (2006.01)
*E05B 65/12* (2006.01)
*F16B 41/00* (2006.01)

(52) U.S. Cl.
USPC ............... 280/507; 70/258; 70/229; 70/232

(58) Field of Classification Search
USPC .................... 280/507; 70/229, 232, 258
See application file for complete search history.

(56) References Cited

U.S. PATENT DOCUMENTS

| | | | | |
|---|---|---|---|---|
| 2,571,349 | A | * | 10/1951 | Eckles ............................. 70/14 |
| 2,785,564 | A | * | 3/1957 | Rossi ............................. 70/232 |
| 3,780,546 | A | | 12/1973 | Longenecker |
| 3,977,221 | A | | 8/1976 | Foote |
| 4,291,557 | A | | 9/1981 | Bulle et al. |
| 4,325,237 | A | * | 4/1982 | Menzie ............................. 70/14 |
| 4,794,769 | A | * | 1/1989 | Persons ............................. 70/232 |
| 4,925,205 | A | | 5/1990 | Villalon et al. |
| D317,426 | S | | 6/1991 | Lytle |
| 5,087,064 | A | | 2/1992 | Guhlin |
| 5,743,548 | A | * | 4/1998 | Gaspard ........................ 280/507 |
| 6,193,261 | B1 | * | 2/2001 | Hahka ........................... 280/515 |
| 6,315,315 | B1 | * | 11/2001 | Seale ............................ 280/507 |
| 6,945,552 | B2 | * | 9/2005 | Stone ............................ 280/507 |
| 7,040,646 | B2 | * | 5/2006 | Pare ............................. 280/507 |
| 7,121,121 | B2 | * | 10/2006 | Wyers ............................ 70/14 |
| 2009/0302574 | A1 | * | 12/2009 | Columbia ...................... 280/507 |
| 2010/0095717 | A9 | * | 4/2010 | Wyers ............................ 70/14 |

* cited by examiner

*Primary Examiner* — James Kramer
*Assistant Examiner* — Wesley Potter

(57) ABSTRACT

A hitch lock device for preventing theft of a trailer featuring a hitch ball with a threaded bolt and a nut adapted to be threaded onto the bolt. Locking pin slots are disposed in the threaded bolt. A lock can be inserted into a slot in the threaded bolt. Locking pins are slidably disposed in each locking pin slot. The locking pins are connected by a spring and can move between an in position in the threaded bolt and an out position protruding from the bolt. The pins are biased in the out position by the spring. When the locking pins are squeezed to the in position the nut can be threaded past the locking pins to sandwich a trailer hitch with the hitch ball. When the lock is inserted into the slot the lock blocks movement of the locking pins and locking the lock prevents removal of the lock.

5 Claims, 6 Drawing Sheets

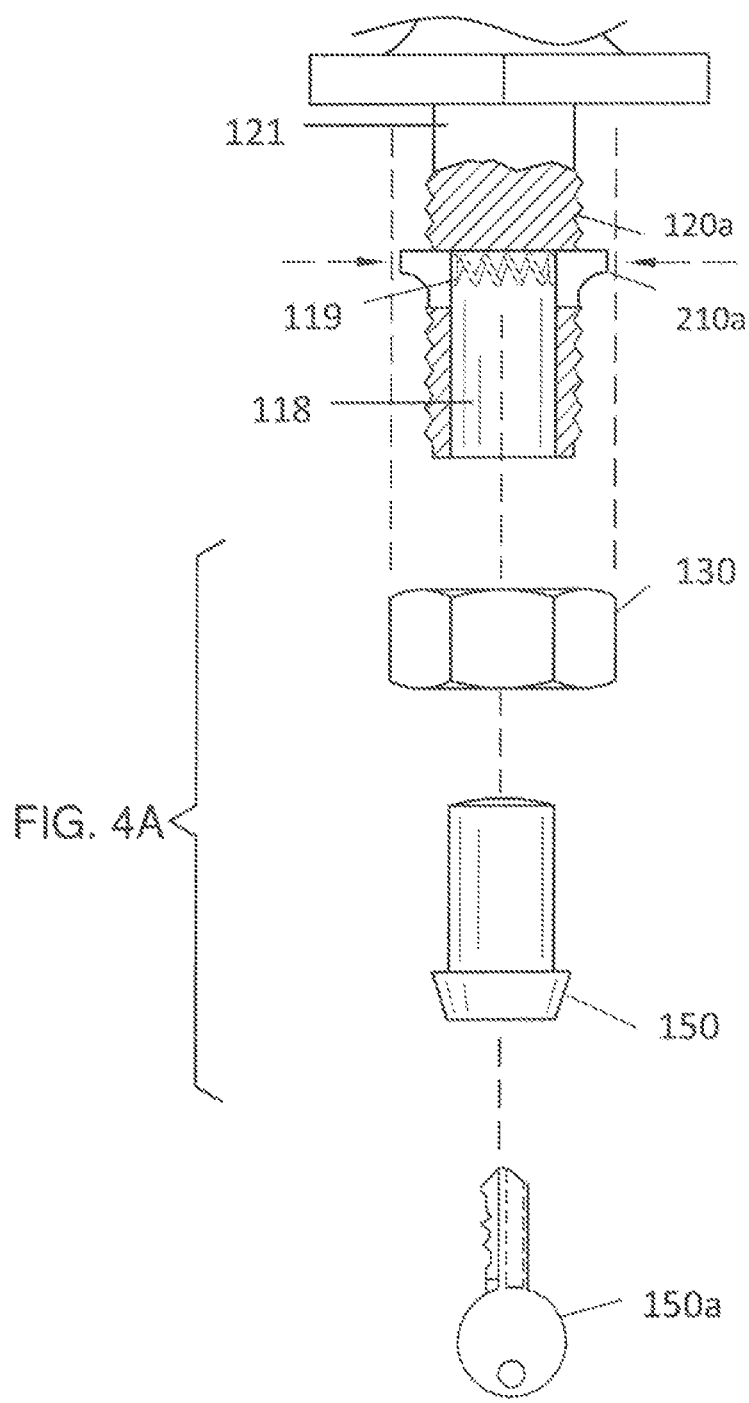

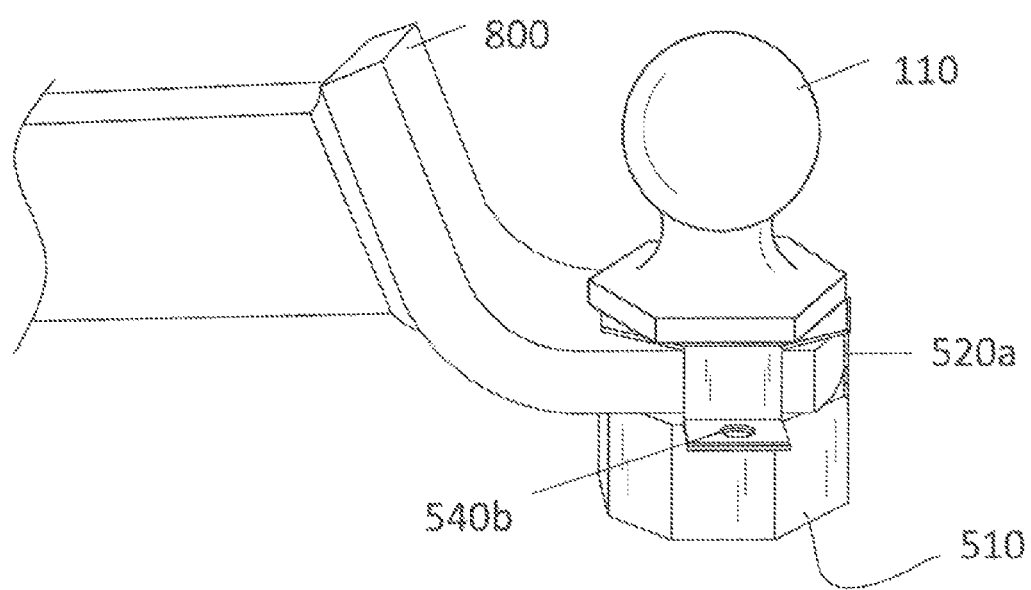
FIG. 6

HITCH LOCK DEVICE FOR TRAILERS

FIELD OF THE INVENTION

The present invention is directed to a hitch accessory for trailers, more particularly to a locking device for hitches.

BACKGROUND OF THE INVENTION

Towing trailers can sometimes be dangerous or unsecure. For example, a trailer may come loose during travel. Or, a trailer can be stolen, for example a thief can unscrew the bottom locking nut of a standard hitch and remove the hitch ball. The present invention features a hitch lock device for locking the hitch. The device features a hitch ball with a key-lock mechanism. The device of the present invention can provide peace of mind to a driver when towing and to a concerned trailer owner instead of fearing theft of an unattended trailer attached to a truck, boat, ATV, camping gear, or other piece of equipment or machinery.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a hitch lock device for locking a hitch. In some embodiments, the hitch lock device comprises a standard hitch ball: a threaded bolt having a first end and a second end, the first end being attached to the standard hitch ball, wherein a first locking pin slot is disposed in a first side of the threaded bolt and a second locking pin slot is disposed in a second side of the threaded bolt opposite the first locking pin slot; a nut adapted to be threaded onto the threaded bolt and move upwardly and downwardly on the threaded bolt in a standard manner; a removable lock adapted to receive a key, the removable lock can move between a locked position when the key is turned in a first direction and an unlocked position the key is turned in a second direction; a slot disposed in the threaded bolt at the second end, the slot is adapted to receive the removable lock; and a first locking pin slidably disposed in the first locking pin slot, and a second half locking pin slidably disposed in the second locking pin slot, a locking pin spring connects the locking pins together, the locking pins can each move between an out position wherein the locking pins protrude from their respective locking pin slots and an in position wherein the locking pins are housed in their locking pin slots, the locking pin spring biases the locking pins in the out position.

When the locking pins are squeezed to the in position the nut can be threaded past the locking pins toward the first end of the threaded bolt and when the locking pins are released to the out position the nut cannot pass the locking pins. When the removable lock is inserted into the slot in the second end of the threaded bolt the removable lock physically blocks movement of the locking pins to the in position. When the key moves the removable lock to the locked position, the removable lock engages an inner surface of the slot preventing removal of the removable lock.

In some embodiments, the slot and the removable lock are generally cylindrical. In some embodiments, the device further comprises a locking box adapted to fit around the hitch lock device and a trailer hitch, the locking box comprises (i) a box base with an inner cavity; (ii) a lid pivotally attached to the box base via a lid hinge, the lid hinge allows a space between the lid and box base when the lid is pivoted over the box base; (iii) a lid hole disposed in the lid adapted to allow passage of the threaded bolt; (iv) a base locking tab with a first locking tab aperture disposed on a top edge of the box base; and (v) a lid locking tab with a second locking tab aperture disposed on an outer edge of the lid, the lid locking tab is aligned with the base locking tab such that when the lid is pivoted over the base box a padlock can be threaded through both locking tab apertures. In some embodiments, the locking box is generally hexagonal, cylindrical, circular, or rectangular. In some embodiments, a base hole is disposed in a bottom surface of the base box.

BRIEF DESCRIPTION OF THE DRAWINGS

FIG. 4A is a side view of the hitch lock device of the present invention, wherein the device is open.

FIG. 6 is a side in-use view of the locking box for the device of the present invention.

DESCRIPTION OF PREFERRED EMBODIMENTS

Figure 1:
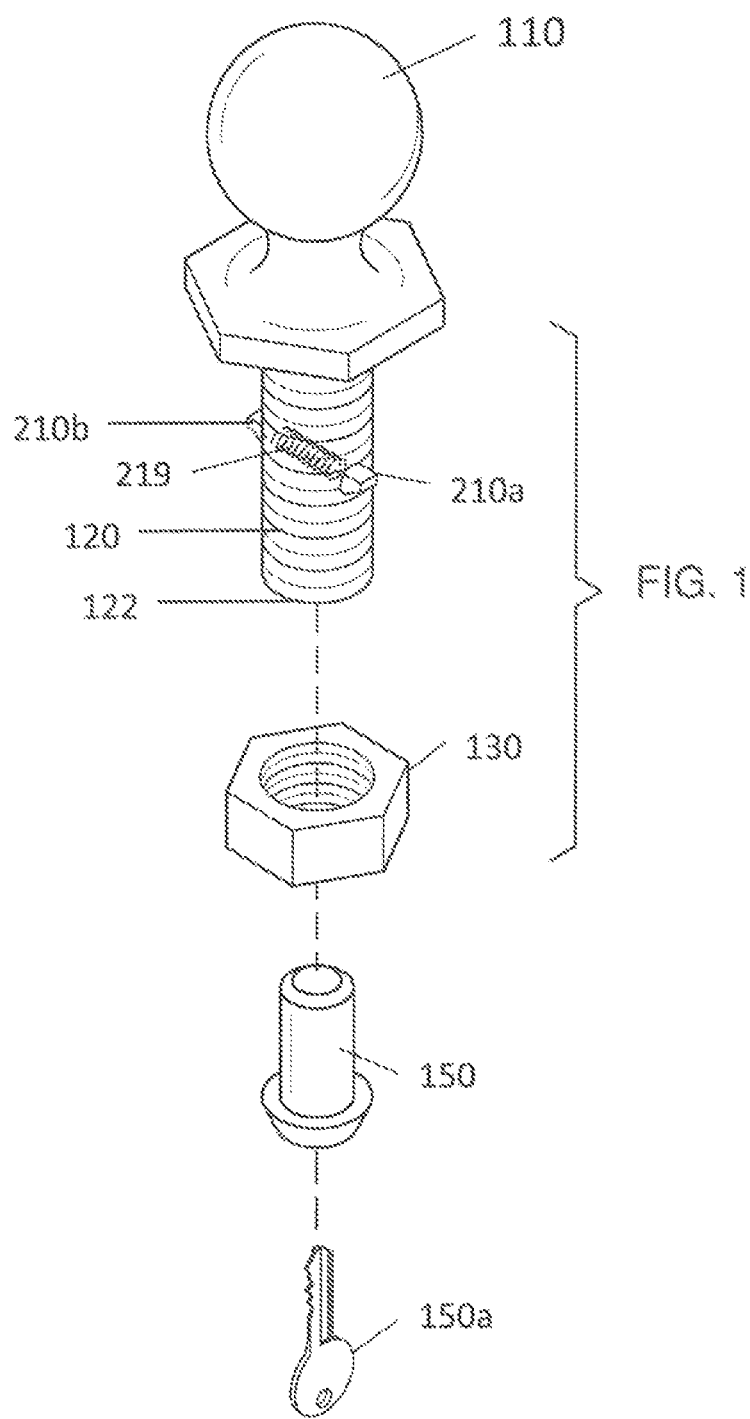
FIG. 1 is a top perspective view of the hitch lock device of the present invention.
Figure 2:
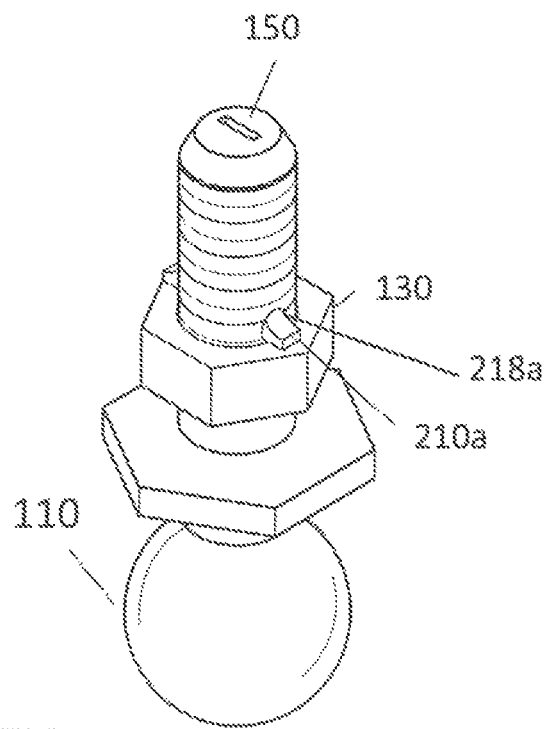
FIG. 2 is a bottom perspective view of the hitch lock device of the present invention.
Figure 3:
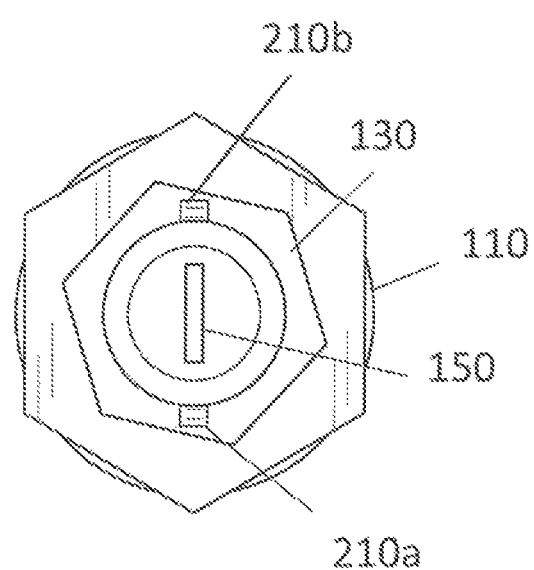
FIG. 3 is a bottom view of the hitch lock device of the present invention.

Referring now to FIGS. 1-6, the present invention features a hitch lock device 100 for helping to prevent loss or theft of a trailer. The hitch lock device 100 of the present invention comprises a standard hitch ball 110. Disposed on the bottom end of the hitch ball 110 is a threaded bolt 120 with threads 120a. The threaded bolt 120 has a first end 121 and a second end 122, the first end 121 being attached to the hitch ball 110. The lock device 100 of the present invention further comprises a nut 130 adapted to be threaded onto the threaded bolt 120 and move upwardly (toward the first end 121) and downwardly on the threaded bolt 120 in a standard manner. Nut and bolt mechanisms are well known to one of ordinary skill in the art.

Disposed in the second end 122 of the threaded bolt 120 is a slot 118. The slot 118 is adapted to receive a removable lock 150. The slot 118 and the removable lock 150 may be generally cylindrical, however the present invention is not limited to this configuration. The removable lock 150 is adapted to receive a key 150a. Such locks and keys are well known to one of ordinary skill in the art. The removable lock 150 extends into the inside of the threaded bolt 120 from the second end (e.g., see FIG. 4 showing the slot 118). The removable lock 150 can move between a locked position and an unlocked position (e.g., via the key 150a). For example, when the key 150a is turned in a first direction (e.g., right), the removable lock 150 is moved to the locked position. When the key 150a is turned in a second direction, the removable lock 150 is moved to the unlocked position.

A first half locking pin 210a is slidably disposed in a first locking pin slot 218a, the first locking pin slot 218a being disposed in a first side of the threaded bolt 120. A second half locking pin 210b is slidably disposed in a second locking pin slot 218b. The second locking pin slot 218b is disposed in a second side of the threaded bolt 120 opposite the first locking pin slot 218a. The locking pins 210 are connected together via a locking pin spring 219, which traverses a portion of the threaded bolt 120 (see FIG. 4A, FIG. 4B). The locking pins 210 can move between an out position wherein the locking pins 210 protrude from the respective locking pin slots 218 and an in position wherein the locking pins 210 are housed in the locking pin slots 218 and do not protrude from the threaded bolt 120. The locking pin spring 219 biases the locking pins 210 in the out position. To move the locking pins to the in position, a user must squeeze the two locking pins 210, pushing them into the interior of the threaded shaft 120 in their respective locking pin slots 218.

Figure 4B:
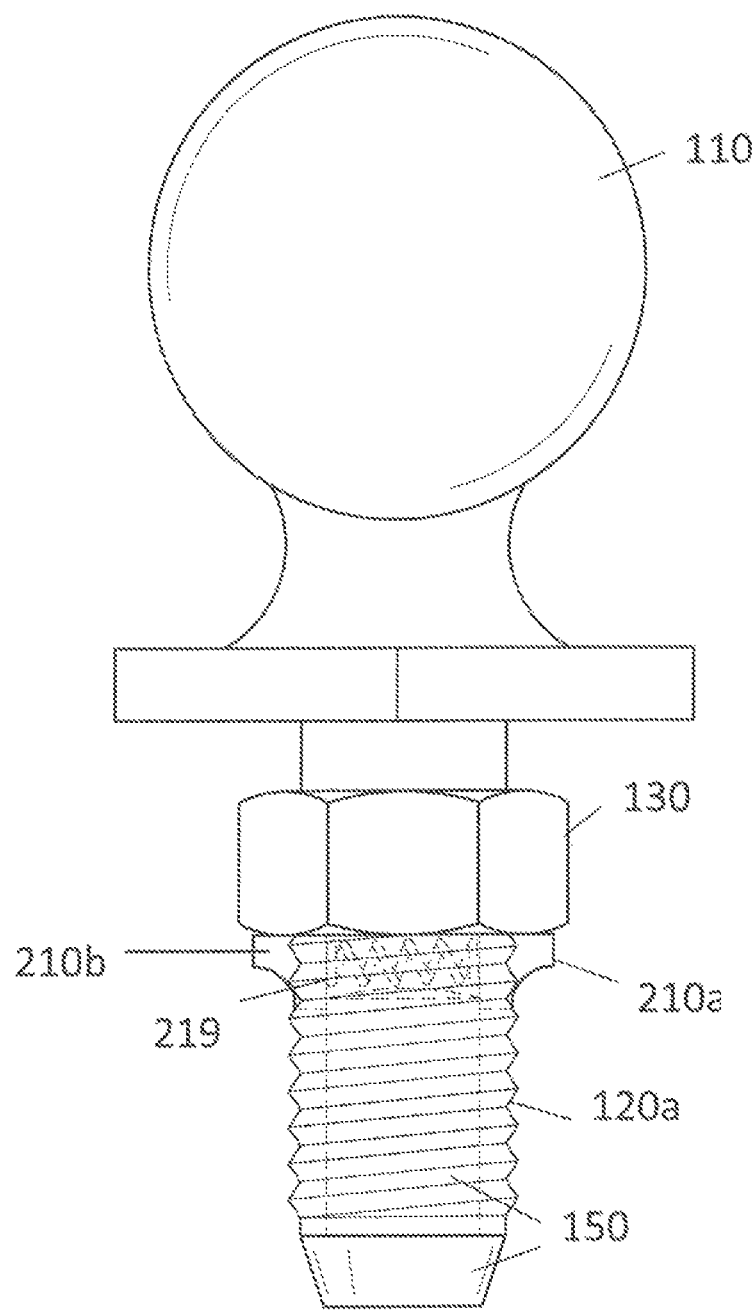
FIG. 4B is a side view of the hitch lock device of the present invention, wherein the device is closed (locked).

When the locking pins 210 are in the in position (e.g., when squeezed), the nut 130 can be threaded past the locking pins 210 toward the first end 121 of the threaded bolt 120 (see FIG. 4B). Once the nut 130 is above the locking pins 210, the locking pins 210 can be released and allowed to return to the out position. After the nut 130 is above the locking pins 210 and the locking pins 210 are released, the removable lock 150 can be inserted into the slot 118 in the second end 122 of the threaded bolt 120. The presence of the removable lock 150 physically blocks movement of the pins 210. Thus, the removable lock 150 functions to prevent the pins 210 from being squeezed and moved to the in position (allowing removal of the nut 130). The removable lock 150 may also function to hold the pins 210 in place. The removable lock 150 locks in the pins 210 just by leaving the lock 150 in place and moving it to the locked position (e.g., turning the key to the right). By moving the lock 150 to the locked position, the lock 150 is prevented from being removed from the slot 118 in the threaded shaft 120. For example, the lock 150, when in the locked position, engages and is secured to the inner surface of the slot 118 of the threaded shaft 120. To remove the lock 150, the lock 150 must be moved to the unlocked position.

When attaching the device 100 to a trailer 800, the threaded bolt 120 is fed through the trailer's aperture. The nut 130 is then threaded to the first end 121 of the threaded bolt 120 (with the pins 210 in the in position). The pins 210 are released to the out position and the lock 150 is locked, preventing movement of the pins 210. This configuration sandwiches the hitch 800 between the locking pins 210 and the hitch ball 110.

Figure 5:
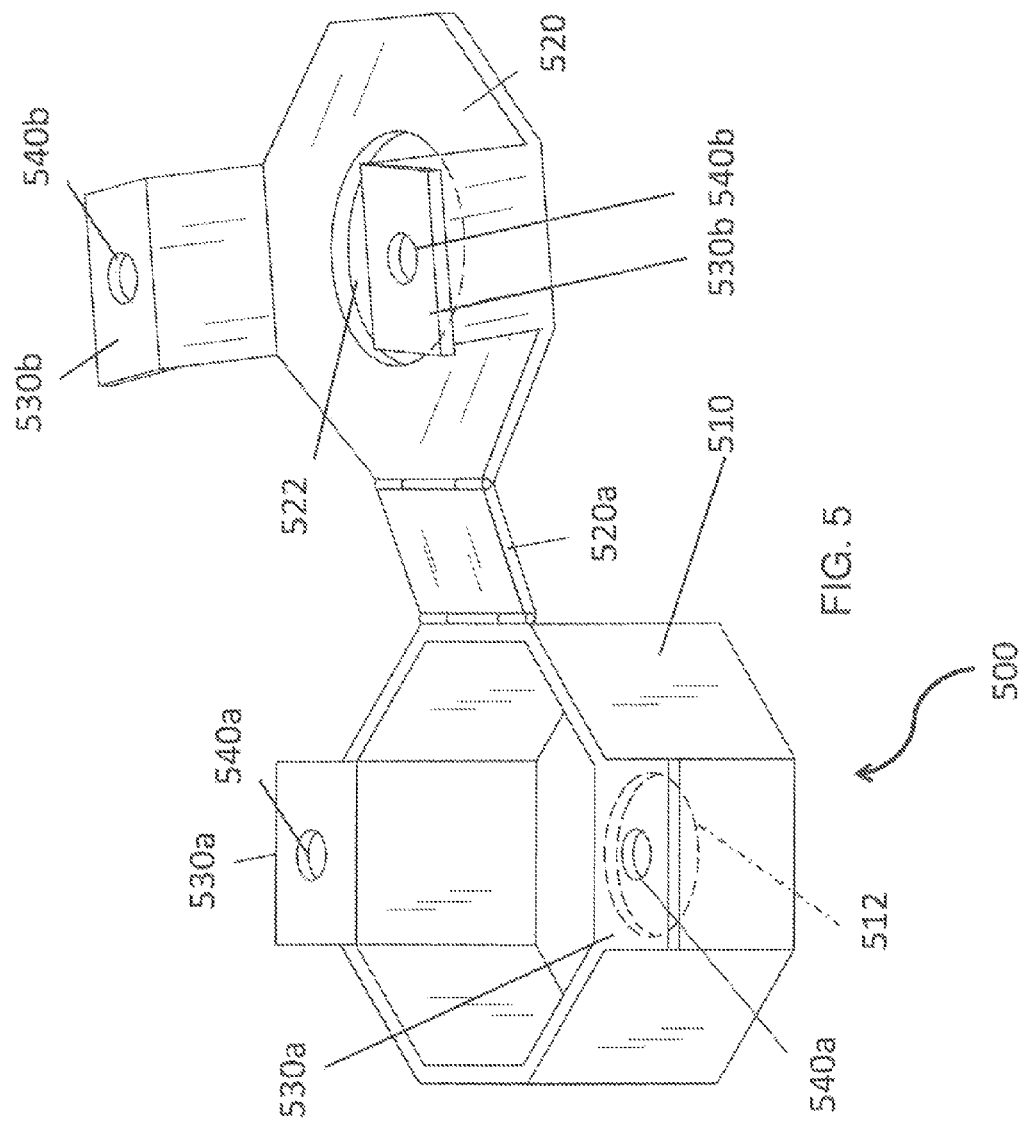
FIG. 5 is a perspective view of a locking box for the device of the present invention.

Referring now to FIG. 5 and FIG. 6, in some embodiments, the device 100 further comprises a locking box 500 that fits around a trailer hitch 800 and around the threaded bolt 120. The locking box 500 can be used when the removable lock 150 is not used. The locking box 500 may be constructed in a variety of shapes and sizes. For example, in some embodiments, the locking box 500 is generally hexagonal, cylindrical/circular, rectangular, etc. The present invention it not limited to the aforementioned shapes.

The locking box 500 has a box base 510 with an inner cavity and a lid 520 pivotally attached to the box base 510 (e.g., via lid hinge 520a). The lid hinge 520a may be a large hinge (e.g., see FIG. 5), allowing space between the lid 520 and the box base 510 (when the lid 520 is pivoted over the box base 510).

A lid hole 522 is disposed in the lid 520 (e.g., in the center of the lid 520). The lid hole 522 is adapted to allow passage of the threaded bolt 120. For example, the lid 520 can be placed atop a standard hitch 800 with the lid hole 522 aligned with the hitch hole, and the threaded bolt 120 can be fed through the lid hole 522 and hitch hole with the hitch ball extending upwardly from the hitch 800 (see FIG. 6). When the lid 520 is placed atop the standard hitch and the threaded bolt 120 is fed through the lid hole 522, the box base 510 can be pivoted such that the threaded bolt 120 is housed in the inner cavity of the box base 510.

A base locking tab 530a with a first locking tab aperture 540a is disposed on the top edge of the box base 510 and extends outwardly from the box base 510 (see FIG. 5). A lid locking tab 530b with a second locking tab aperture 540b is disposed on an outer edge of the lid 520 and extends outwardly from the lid 520. The lid locking tab 530b is aligned with the base locking tab 530a such that when the lid 520 is pivoted over the base box 520 a padlock (or other lock) can be threaded through both locking tab apertures 540 to secure the locking box 500 around the device 100 and prevent access to the device 100. In some embodiments, a base hole 512 is disposed in the bottom surface of the base box 510 (see FIG. 5).

The disclosures of the following U.S. Patents are incorporated in their entirety by reference herein: U.S. Pat. No. 3,977,221; U.S. Pat. No. 3,780,546; U.S. Pat. No. 6,315,315; U.S. Pat. No. 4,291,557; U.S. Pat. No. 5,087,064; U.S. Pat. No. 4,925,205; U.S. Design Pat. No. D317,426.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A hitch lock device comprising:
   (a) a standard hitch ball;
   (b) a threaded bolt having a first end and a second end, the first end being attached to the standard hitch ball, wherein a first locking pin slot is disposed in a first side of the threaded bolt and a second locking pin slot is disposed in a second side of the threaded bolt opposite the first locking pin slot;
   (c) a nut adapted to be threaded onto the threaded bolt and move upwardly and downwardly on the threaded bolt in a standard manner;
   (d) a removable lock adapted to receive a key, the removable lock can move between a locked position when the key is turned in a first direction and an unlocked position the key is turned in a second direction;
   (e) a slot disposed in the threaded bolt at the second end, the slot is adapted to receive the removable lock; and
   (f) a first locking pin slidably disposed in the first locking pin slot, and a second locking pin slidably disposed in the second locking pin slot, a locking pin spring connects the locking pins together, the locking pins can each move between an out position wherein the locking pins protrude from their respective locking pin slots and an in position wherein the locking pins are housed in their locking pin slots, the locking pin spring biases the locking pins in the out position;

wherein when the locking pins are squeezed to the in position the nut can be threaded past the locking pins toward the first end of the threaded bolt and when the locking pins are released to the out position the nut cannot pass the locking pins, wherein when the removable lock is inserted into the slot in the second end of the threaded bolt the removable lock physically blocks movement of the locking pins to the in position and when the key moves the removable lock to the locked position, the removable lock engages an inner surface of the slot preventing removal of the removable lock.

2. The hitch lock device of claim 1, wherein the slot and the removable lock are generally cylindrical.

3. The hitch lock device of claim 1, further comprising a locking box adapted to fit around the hitch lock device and a trailer hitch, the locking box comprises (i) a box base with an inner cavity; (ii) a lid pivotally attached to the box base via a lid hinge, the lid hinge allows a space between the lid and box base when the lid is pivoted over the box base; (iii) a lid hole disposed in the lid adapted to allow passage of the threaded bolt; (iv) a base locking tab with a first locking tab aperture disposed on a top edge of the box base; and (v) a lid locking tab with a second locking tab aperture disposed on an outer edge of the lid, the lid locking tab is aligned with the base locking tab such that when the lid is pivoted over the base box a padlock can be threaded through both locking tab apertures.

4. The hitch lock device of claim 3, wherein the locking box is generally hexagonal, cylindrical, circular, or rectangular.

5. The hitch lock device of claim 3, wherein a base hole is disposed in a bottom surface of the base box.

* * * * *